Figure 1:
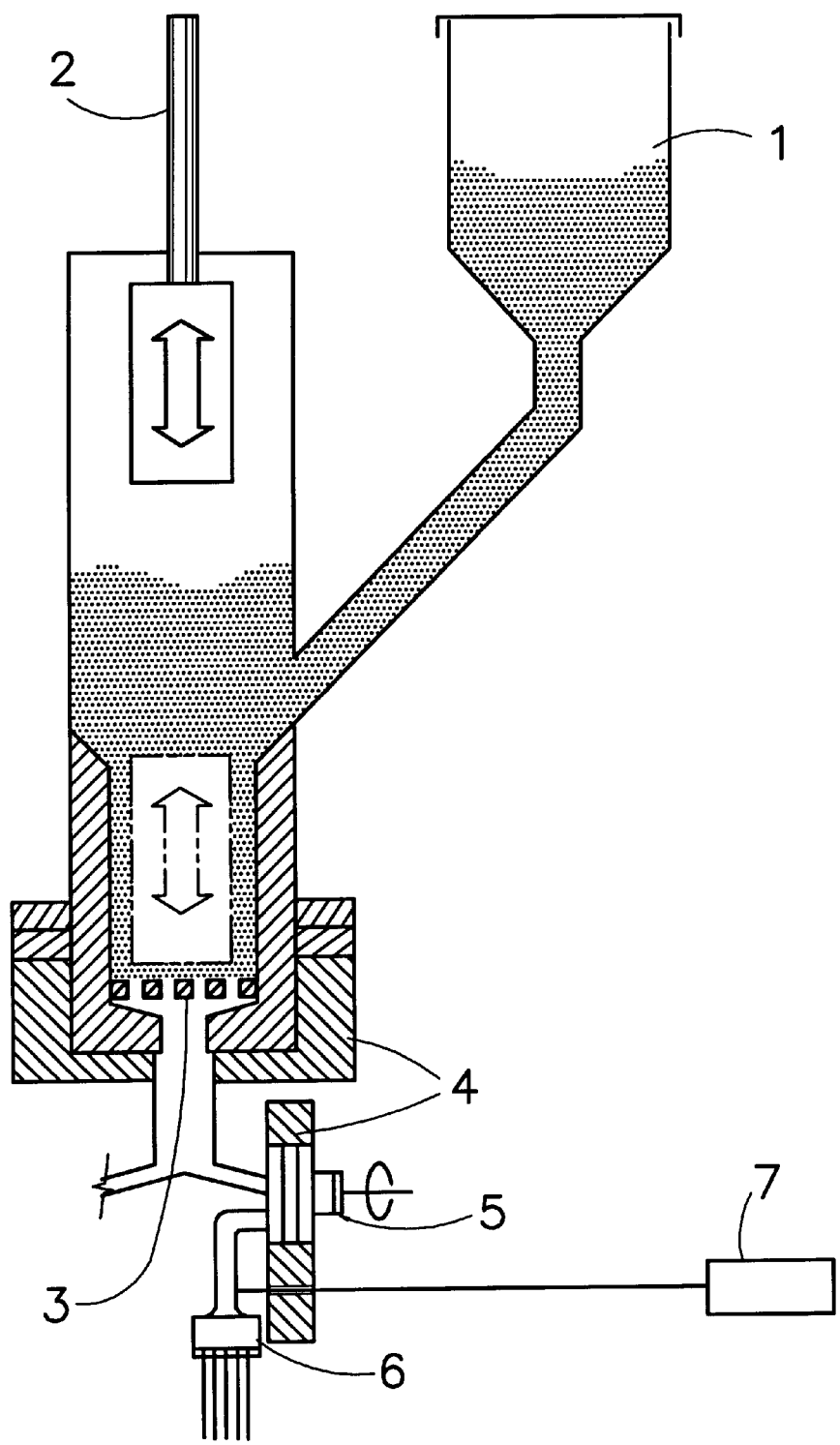

United States Patent [19]
Kawaji et al.

[11] Patent Number: 6,153,679
[45] Date of Patent: *Nov. 28, 2000

[54] TITANIUM OXIDE AND RESIN COMPOSITION

[75] Inventors: Tomio Kawaji; Ryosuke Asakura, both of Chita; Tomohiro Taniguchi, Kyoto, all of Japan

[73] Assignee: Toray Industries, Inc., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/029,537

[22] PCT Filed: Jun. 27, 1997

[86] PCT No.: PCT/JP97/02249

§ 371 Date: Mar. 20, 1998

§ 102(e) Date: Mar. 20, 1998

[87] PCT Pub. No.: WO98/00365

PCT Pub. Date: Jan. 8, 1998

[30] Foreign Application Priority Data

Jun. 28, 1996 [JP] Japan ..................................... 8-170134

[51] Int. Cl.$^7$ ................. C08K 3/22; C08L 31/08

[52] U.S. Cl. .................. 524/413; 423/610; 524/413; 524/847; 528/279; 528/425

[58] Field of Search ..................... 528/279, 193, 528/425; 524/413, 497, 847; 423/610

[56] References Cited

U.S. PATENT DOCUMENTS

| 3,663,499 | 5/1972 | Brinkmann | 524/847 |
| 4,388,425 | 6/1983 | Strehler et al. | 524/847 |

FOREIGN PATENT DOCUMENTS

| 288163 | 3/1991 | Germany | 524/497 |
| 18423 | 1/1987 | Japan | 524/847 |
| 79226 | 3/1989 | Japan | 524/497 |

*Primary Examiner*—Peter A. Szekely
*Attorney, Agent, or Firm*—Austin R. Miller

[57] ABSTRACT

Titanium oxide and a thermoplastic resin composition incorporated therewith, said titanium oxide being characterized by its property that it disperses into ethylene glycol (as a dispersing medium) to give a 13 wt % suspension which has a specific resistance higher than 7000 Ω·cm and passes through a filter paper with a pore size of 6 μm such that the filtration pressure does not exceed 100 kPa after filtration for 4 minutes at a flow rate of 1.73 cm$^3$/min·cm$^2$.

14 Claims, 1 Drawing Sheet

TITANIUM OXIDE AND RESIN COMPOSITION

TECHNICAL FIELD

The present invention relates to titanium oxide and a process for production thereof and also to a thermoplastic resin composition containing said titanium oxide.

BACKGROUND ART

Polyester consisting mainly of repeating units of ethylene terephthalate finds use as fiber, film, moldings, etc. in a variety of industrial fields because of its outstanding moldability and physical properties. It is often incorporated with titanium oxide to impart whiteness, opacity, lubricity, etc. The resulting polyester resin composition, however, poses a problem with frequent filament breakage or film breakage during processing or with film defects leading to uneven printing and surface irregularities.

Among several ideas proposed so far to address this problem is Japanese Patent Publication No. 265948/1988 which discloses a polyester composition containing highly dispersible titanium oxide characterized by its specific average particle diameter and water content as well as its surface treatment with an aluminum compound and/or silicon compound. Unfortunately, the surface treatment contributes only a little to improvement in the filament and film producing processes for its added cost, because it has no effect on coarse particles originally present in titanium oxide.

DISCLOSURE OF THE INVENTION

The present inventors carried out extensive studies to radically reduce coarse particles originally present in titanium oxide by noting how titanium oxide is dispersed in the resin composition. The studies led to the present invention which covers:

1. Titanium oxide characterized by its property that it disperses into ethylene glycol (as a dispersing medium) to give a 13 wt % suspension which has a specific resistance higher than 7000 Ω·cm and passes through a filter paper with a pore size of 6 μm such that the filtration pressure does not exceed 100 kPa after filtration for 4 minutes at a flow rate of 1.73 cm³/min·cm².

2. A thermoplastic resin composition which comprises a thermoplastic resin and the titanium oxide defined above.

3. A thermoplastic resin composition which comprises a polyester resin and the titanium oxide defined above.

4. A polyester resin composition which is composed of a polyester resin and titanium oxide and is characterized by its property that it passes through a filtration pressure tester under the following conditions such that the rise in filtration pressure after filtration for 1 hour satisfies the equation (I) below.

$$P \leq 0.2C + 0.2 \quad (I)$$

where P is the rise in filtration pressure (MPa) and C is the content (wt %) of titanium oxide in the composition, provided that $0.3 \leq C \leq 15$.
Measuring temperature: 300° C.
Rate of filtration: 1.11 g/min·cm²
Pore size of filter: 7 μm 5. A process for producing a polyester resin composition composed of a polyester resin and titanium oxide, said process comprising adding a suspension in ethylene glycol of the titanium oxide defined in (1) above in the course of polymerization for polyester resin.

6. A process for producing a polyester resin composition composed of a polyester resin and titanium oxide, said process comprising incorporating, by using a mixer, the titanium oxide defined in (1) above into a polyester resin after the polymerization for the polyester resin is substantially complete.

7. A process for producing titanium oxide which comprises the steps of dispersing raw titanium oxide into a liquid, clearing the resulting titanium oxide dispersion of coarse titanium oxide particles, freeing the titanium oxide dispersion of liquid by drying, and causing the titanium oxide obtained in the previous step to impinge upon an object by the aid of a gas stream.

8. A process as defined in (7) above which gives rise to titanium oxide characterized by its property that it disperses into ethylene glycol (as a dispersing medium) to give a 13 wt % suspension which has a specific resistance higher than 7000 Ω·cm and passes through a filter paper with a pore size of 6 μm such that the filtration pressure does not exceed 100 kPa after filtration for 4 minutes at a flow rate of 1.73 cm³/min·cm².

BRIEF DESCRIPTIONS OF THE FIGURES

FIG. 1 is a schematic sectional view illustrating how to test the filtering characteristics in the present invention.

BEST MODE FOR CARRYING OUT THE INVENTION

The present invention is concerned with particulate titanium oxide characterized by its property that it disperses into ethylene glycol (as a dispersing medium) to give a 13 wt % suspension which has a specific resistance higher than 7000 Ω·cm and passes through a filter paper with a pore size of 6 μm such that the filtration pressure does not exceed 100 kPa after filtration for 4 minutes at a flow rate of 1.73 cm³/min·cm². A failure to meet these requirements results in a polyester resin composition which is subject to frequent filament breakage during spinning. The filter paper with a pore size of 6 μm is available from Nippon Por Co., Ltd. under a trade name of "Ultipor GF" Discs P/N 6 micron 47 mm.

The titanium oxide specified above may be prepared by the following procedure.

1. Dispersing raw titanium oxide into a liquid (such as water).

2. Removing coarse particles of titanium oxide by centrifuging or the like.

3. Recovering titanium oxide particles from the dispersion by evaporation.

4. Causing titanium oxide particles to collide with each other or to impinge upon an object (such as walls of the apparatus or baffles placed in the apparatus) by the aid of a gas jet stream, thereby crushing coarse particles which might have occurred due to aggregation in step (3) above.

The titanium oxide of the present invention is intended to be incorporated into a thermoplastic resin, preferably a polyester resin, for production of a resin composition. The polyester is one in which the dicarboxylic acid moiety is terephthalic acid (or an ester-forming derivative thereof) and the glycol moiety is ethylene glycol or butylene glycol (or an ester-forming derivative thereof). Preferred examples include polyethylene terephthalate and polybutylene terephthalate. Other examples include copolyesters in which more than 70% of the repeating units in the main chain is ethylene terephthalate or tetramethylene terephthalate, with the terephthalic acid moiety being partly replaced by a difunctional carboxylic acid (or an ester-forming derivative thereof) and the glycol moiety being partly replaced by an aliphatic, alicyclic, or aromatic dihydroxy compound (or an ester-forming derivative thereof). The difunctional carboxylic acid includes, for example, sodium 5-sulfoisophthalic acid, potassium 5-sulfoisophthalic acid, p-β-hydroxyethoxybenzoic acid, p-hydroxybenzoic acid, isophthalic acid, 4,4'-diphenyletherdicarboxylic acid, 4,4'-diphenylmethanedicarboxylic acid, 4,4'-diphenyletherdicarboxylic acid, 4,4'-diphenyldicarboxylic acid, 1,2'-diphenoxyethane-p,p'-dicarboxylic acid, 2,6-naphthalenedicarboxylic acid, adipic acid, and sebacic acid. The dihydroxy compounds include, for example, trimethylene glycol, tetramethylene glycol, hexamethylene glycol, diethylene glycol, triethylene glycol, polyethylene glycol, 1,4-cyclohexanediol, 1,4-cyclohexanedimethanol, 1,4-bis-β-hydroxyethoxybenzene, and bisphenol A.

The polyester resin may be produced continuously or batchwise. Production of polyethylene terephthalate (as a polyester resin) consists of two steps. The first step involves the direct esterification reaction between terephthalic acid and ethylene glycol, or the ester interchange reaction between dimethyl terephthalate (as a lower alkyl ester of terephthalic acid) and ethylene glycol, or the reaction between terephthalic acid and ethylene oxide which yields a glycol ester of terephthalic acid and/or an oligomer thereof. The second step involves the polycondensation reaction under reduced pressure to produce a polymer with a desired degree of polymerization from the reaction product obtained in the first step.

In the process of producing the polyester resin composition of the present invention, it is possible to add titanium oxide in the course of polymerization of the polyester resin, or after the polymerization is substantially complete, or after the polyester resin has been made into pellets, with the former two methods being preferable. A preferred way for the first method is to disperse titanium oxide into glycol and add the resulting dispersion to the polymerization system containing an oligomer of polyester. A preferred way for the second method is to incorporate titanium oxide directly into molten polymer immediately after polymerization using a mixer.

According to the present invention, the polyester resin composition composed of a polyester resin and titanium oxide should meet the requirement that it passes through a filtration pressure tester such that the rise in filtration pressure after filtration for 1 hour satisfies the equation (I) below.

$$P \leq 0.2C + 0.2 \quad (I)$$

where P is the rise in filtration pressure (MPa) and C is the content (wt %) of titanium oxide in the composition, provided that $0.3 \leq C + 15$ when tested under the condition that the measuring temperature is 300° C., the rate of filtration is 1.11 g/min·cm$^2$, and the pore size of the filter is 7 μm.

The filter that can be used for this test is "Dynaloy Filter X5". The filtration pressure tester is available from Fuji Filter Kogyo Co., Ltd., and the filter is available from Watanabe Giichi Seisakusho Co., Ltd. (in Kyoto).

The filtration test is illustrated in FIG. 1. It consists of the steps of:

1. charging a sample of polyester resin composition (in the form of pellets) into the hopper 1.
2. heating the aluminum block heater 4 until the hot plate 3 is heated to 300° C. (which is the measuring temperature).
3. actuating the piston 2, thereby pressing the melt of the sample against the hot plate.
4. running the gear pump 5, thereby discharging the melt of the sample through the filter at a prescribed rate for 4 hours, and recording the filtration pressure on the recorder 7 during discharging.

The polyester resin for incorporation with the titanium oxide of the present invention may be polymerized batchwise or continuously. In the second case, it is desirable to add titanium oxide after polymerization is substantially complete. This obviates the necessity of purging the polymerizer but it is only necessary to purge the mixer when one grade of polyester resin composition is to be switched to another.

EXAMPLES

The invention will be described in more detail with reference to the following examples.

Preparation of titanium oxide samples A to E:

Five samples A to E of titanium oxide for incorporation into polyester resin were prepared by the process shown in Table 1 from raw titanium oxide (TA-110) available from Fuji Titan Kogyo Co., Ltd.). The process involves the centrifugal separation of coarse particles and the mechanical crushing of coarse particles. The former is accomplished by using an ultracentrifuge ("Super-decanter P-3000" from Tomoe Engineering Co., Ltd.). The latter is accomplished by using a dry crusher ("Jet Mill STJ-200" from Seishin Kigyo Co., Ltd.) which is designed such that coarse particles are caused to impinge upon the wall of the equipment by means of an air jet. The rates of crushing for samples D and E are 10 kg/h and 5 kg/h, respectively.

Each of titanium oxide samples A to E was mixed with ethylene glycol to give a 13 wt % suspension. The suspension was stirred at 300 rpm for 1 hour. Then the suspension was passed through a filter paper (47 mm in diameter, specified above) at a flow rate of 30 cm$^3$/min (which is equivalent to 1.73 cm$^3$/min·cm$^2$) and the rise in filtration pressure was measured. The specific resistance of the suspension was measured in the following manner. A sample (20 g) is dispersed into pure water (180 g) by thorough mixing in a 300-ml beaker. This pure water should have a specific resistance higher than $25 \times 10^4$ Ω·cm. The resulting dispersion is boiled for 5 minutes on an electric heater. After cooling to room temperature, the dispersion is replenished with pure water so that the total weight is 200±0.1 g. The suspension is measured for electrical conductivity at 18° C. using an electric conductivity meter ("CM-30S" from Toa Dempa Co., Ltd.) The reading is converted into the specific resistance as follows.

Specific resistance (Ω·cm)=$1/R \times 10^6$ where R is the electric conductivity (μS/cm).

TABLE 1

| Sample | Treatment of titanium oxide | Rise in filtration pressure (kPa/4 min) | Specific resistance (Ω · cm) |
|---|---|---|---|
| A | Dispersion in water, removal of coarse particles by centrifuge, drying, and crushing of coarse particles by dry crusher | 92 | 7400 |
| B | Dispersion in water, and removal of coarse particles by centrifuge | 128 | 7400 |
| C | Dispersion in ethylene glycol, and removal of coarse particles by centrifuge | 135 | 2800 |

TABLE 1-continued

| Sample | Treatment of titanium oxide | Rise in filtration pressure (kPa/4 min) | Specific resistance (Ω · cm) |
|---|---|---|---|
| D | Crushing of coarse particles by dry crusher (10 kg/h) | 105 | 2800 |
| E | Crushing of coarse particles by dry crusher (5 kg/h) | 95 | 2800 |

Example 1 and Comparative Examples 1, 10, 19, and 28

Each of titanium oxide samples A to E was dispersed into ethylene glycol to give a suspension (slurry), 16 g/100 cm$^3$ in concentration. A polyester (polyethylene terephthalate) was prepared from ethylene glycol and terephthalic acid by continuous direct polymerization using an apparatus consisting of a first esterification vessel, a second esterification vessel, a first preliminary polymerizer, a second preliminary polymerizer, and a final polymerizer. The slurry was added continuously to the oligomer (with 97% esterification) during its transfer from the second esterification vessel to the first preliminary polymerizer. Thus the final polymerization gave the desired polyester resin composition composed of a polyester resin and titanium oxide. Incidentally, this polyester resin has an intrinsic viscosity of 0.64 measured at 25° C. in o-chlorophenol.

The polyester resin composition was tested for rise in filtration pressure under the following conditions by using "Melt spinning tester CII" (shown in FIG. 1), available from Fuji Filter Kogyo Co., Ltd.

Measuring temperature: 300° C.
Feeding rate: 5 g/min
Filter: "Dynaloy Filter X5", having a pore size of 7 μm and a filter area of 4.52 cm$^2$. Available from Watanabe Giichi Seisakusho Co., Ltd.

Rise in filtration pressure was recorded after filtration for 1 hour. The results are shown in Table 2. The polyester resin composition was spun into a multifilament yarn (4.17 denier for single filament) at a rate of 6000 m/min. The frequencies of filament breakage per ton were recorded during spinning. The results are shown in Table 3.

Example 2 and Comparative Examples 2, 11, 20, and 29

The desired polyester resin composition was prepared in the same manner as in Example 1 except that polymerization was carried out by using a batch-type apparatus for the steps of esterification and polymerization and the titanium oxide slurry was added to the second step at its outset. It was tested in the same manner as in Example 1. The results are shown in Table 3.

Example 3 and Comparative Examples 3, 12, 21, and 30

The desired polyester resin composition was prepared in the same manner as in Example 1 except the titanium oxide slurry was added to the polyester by using a mixer attached to the final polymerizer such that the resulting composition contained as much titanium oxide as shown in Table 2. (The mixer is of twin-screw type turning in the same directions, "TEM-48BS" from Toshiba Kikai Co., Ltd.) It was tested in the same manner as in Example 1. The results are shown in Table 3.

Examples 4–9 and Comparative Examples 4–9, 13–18, 21–27, 31–36

The desired polyester composition was prepared by any of the methods in Examples 1 to 3 as shown in Table 2. It was tested in the same manner as in Example 1. The results are shown in Table 3.

It is noted from Tables 1 to 3 that the polyester resin composition pertaining to the present invention suffers filament breakage merely infrequently.

TABLE 2

| | No. | Designation of titanium oxide | Method of polymerization | Amount of titanium oxide in composition (wt %) | Method of incorporation of titanium oxide into polyethylene terephthalate |
|---|---|---|---|---|---|
| Example | 1 | A | Continuous | 2.2 | into 92% esterified oligomer via ethylene glycol slurry |
| Example | 2 | A | Batchwise | 2.2 | Same as Example 1 |
| Example | 3 | A | Continuous | 2.2 | into molten polymer by mixing after polymerization |
| Example | 4 | A | Continuous | 0.4 | Same as Example 1 |
| Example | 5 | A | Batchwise | 0.4 | Same as Example 2 |
| Example | 6 | A | Continuous | 0.4 | Same as Example 3 |
| Example | 7 | A | Continuous | 5.0 | Same as Example 1 |
| Example | 8 | A | Batchwise | 5.0 | Same as Example 2 |
| Example | 9 | A | Continuous | 5.0 | Same as Example 3 |
| Comparative Example | 1 | B | Continuous | 2.2 | Same as Example 1 |
| Comparative Example | 2 | B | Batchwise | 2.2 | Same as Example 2 |
| Comparative Example | 3 | B | Batchwise | 2.2 | Same as Example 3 |
| Comparative Example | 4 | B | Continuous | 0.4 | Same as Example 1 |
| Comparative Example | 5 | B | Batchwise | 0.4 | Same as Example 2 |
| Comparative Example | 6 | B | Continuous | 0.4 | Same as Example 3 |
| Comparative Example | 7 | B | Continuous | 5.0 | Same as Example 1 |
| Comparative Example | 8 | B | Batchwise | 5.0 | Same as Example 2 |
| Comparative Example | 9 | B | Continuous | 5.0 | Same as Example 3 |
| Comparative Example | 10 | C | Continuous | 2.2 | Same as Example 1 |
| Comparative Example | 11 | C | Batchwise | 2.2 | Same as Example 2 |
| Comparative Example | 12 | C | Continuous | 2.2 | Same as Example 3 |
| Comparative Example | 13 | C | Continuous | 0.4 | Same as Example 1 |
| Comparative Example | 14 | C | Batchwise | 0.4 | Same as Example 2 |

TABLE 2-continued

|  | No. | Designation of titanium oxide | Method of polymerization | Amount of titanium oxide in composition (wt %) | Method of incorporation of titanium oxide into polyethylene terephthalate |
|---|---|---|---|---|---|
| Comparative Example | 15 | C | Continuous | 0.4 | Same as Example 3 |
| Comparative Example | 16 | C | Continuous | 5.0 | Same as Example 1 |
| Comparative Example | 17 | C | Batchwise | 5.0 | Same as Example 2 |
| Comparative Example | 18 | C | Continuous | 5.0 | Same as Example 3 |
| Comparative Example | 19 | D | Continuous | 2.2 | Same as Example 1 |
| Comparative Example | 20 | D | Batchwise | 2.2 | Same as Example 2 |
| Comparative Example | 21 | D | Continuous | 2.2 | Same as Example 3 |
| Comparative Example | 22 | D | Continuous | 0.4 | Same as Example 1 |
| Comparative Example | 23 | D | Batchwise | 0.4 | Same as Example 2 |
| Comparative Example | 24 | D | Continuous | 0.4 | Same as Example 3 |
| Comparative Example | 25 | D | Continuous | 5.0 | Same as Example 1 |
| Comparative Example | 26 | D | Batchwise | 5.0 | Same as Example 2 |
| Comparative Example | 27 | D | Continuous | 5.0 | Same as Example 3 |
| Comparative Example | 28 | E | Continuous | 2.2 | Same as Example 1 |
| Comparative Example | 29 | E | Batchwise | 2.2 | Same as Example 2 |
| Comparative Example | 30 | E | Continuous | 2.2 | Same as Example 3 |
| Comparative Example | 31 | E | Continuous | 0.4 | Same as Example 1 |
| Comparative Example | 32 | E | Batchwise | 0.4 | Same as Example 2 |
| Comparative Example | 33 | E | Continuous | 0.4 | Same as Example 3 |
| Comparative Example | 34 | E | Continuous | 5.0 | Same as Example 1 |
| Comparative Example | 35 | E | Batchwise | 5.0 | Same as Example 2 |
| Comparative Example | 36 | E | Continuous | 5.0 | Same as Example 3 |

TABLE 3

|  | No. | Designation of titanium oxide | Amount of titanium oxide in composition (wt %) | Rise in filtration pressure (MPa/h) | Frequencies of filament breakage per ton |
|---|---|---|---|---|---|
| Example | 1 | A | 2.2 | 0.54 | 0.3 |
| Example | 2 | A | 2.2 | 0.60 | 0.3 |
| Example | 3 | A | 2.2 | 0.62 | 0.4 |
| Example | 4 | A | 0.4 | 0.19 | 0.0 |
| Example | 5 | A | 0.4 | 0.22 | 0.1 |
| Example | 6 | A | 0.4 | 0.26 | 0.1 |
| Example | 7 | A | 5.0 | 1.02 | 0.5 |
| Example | 8 | A | 5.0 | 1.12 | 0.5 |
| Example | 9 | A | 5.0 | 1.19 | 0.5 |
| Comparative Example | 1 | B | 2.2 | 0.88 | 1.5 |
| Comparative Example | 2 | B | 2.2 | 0.92 | 1.6 |
| Comparative Example | 3 | B | 2.2 | 1.00 | 2.5 |
| Comparative Example | 4 | B | 0.4 | 0.45 | 0.9 |
| Comparative Example | 5 | B | 0.4 | 0.52 | 1.0 |
| Comparative Example | 6 | B | 0.4 | 0.53 | 1.0 |
| Comparative Example | 7 | B | 5.0 | 1.52 | 2.5 |
| Comparative Example | 8 | B | 5.0 | 1.62 | 3.5 |
| Comparative Example | 9 | B | 5.0 | 1.87 | 3.7 |
| Comparative Example | 10 | C | 2.2 | 0.95 | 2.0 |
| Comparative Example | 11 | C | 2.2 | 0.99 | 2.2 |
| Comparative Example | 12 | C | 2.2 | 1.03 | 3.5 |
| Comparative Example | 13 | C | 0.4 | 0.56 | 1.2 |
| Comparative Example | 14 | C | 0.4 | 0.57 | 1.4 |
| Comparative Example | 15 | C | 0.4 | 0.62 | 1.5 |
| Comparative Example | 16 | C | 5.0 | 1.66 | 3.5 |
| Comparative Example | 17 | C | 5.0 | 1.80 | 3.8 |
| Comparative Example | 18 | C | 5.0 | 1.89 | 3.9 |
| Comparative Example | 19 | D | 2.2 | 0.66 | 1.2 |
| Comparative Example | 20 | D | 2.2 | 0.69 | 1.5 |
| Comparative Example | 21 | D | 2.2 | 0.71 | 1.6 |
| Comparative Example | 22 | D | 0.4 | 0.30 | 0.8 |
| Comparative Example | 23 | D | 0.4 | 0.39 | 0.9 |
| Comparative Example | 24 | D | 0.4 | 0.40 | 1.0 |
| Comparative Example | 25 | D | 5.0 | 1.25 | 2.5 |
| Comparative Example | 26 | D | 5.0 | 1.26 | 2.6 |
| Comparative Example | 27 | D | 5.0 | 1.30 | 2.9 |
| Comparative Example | 28 | E | 2.2 | 0.95 | 2.4 |
| Comparative Example | 29 | E | 2.2 | 1.02 | 2.6 |
| Comparative Example | 30 | E | 2.2 | 1.13 | 2.8 |
| Comparative Example | 31 | E | 0.4 | 0.59 | 1.3 |

TABLE 3-continued

|  | No. | Designation of titanium oxide | Amount of titanium oxide in composition (wt %) | Rise in filtration pressure (MPa/h) | Frequencies of filament breakage per ton |
|---|---|---|---|---|---|
| Comparative Example | 32 | E | 0.4 | 0.64 | 1.5 |
| Comparative Example | 33 | E | 0.4 | 0.65 | 1.7 |
| Comparative Example | 34 | E | 5.0 | 1.63 | 3.6 |
| Comparative Example | 35 | E | 5.0 | 1.75 | 3.8 |
| Comparative Example | 36 | E | 5.0 | 1.97 | 4.0 |

Exploitation in Industry

The present invention greatly contributes to the synthetic fiber industry because the specific titanium oxide produced by the improved process makes the thermoplastic resin composition incorporated therewith less subject to filament breakage during spinning.

We claim:

1. Centrifuged and dry crushed titanium oxide particles characterized by their property that when the particles disperse into ethylene glycol to give a 13% suspension which passes through a filter paper with a pore size of 6 μm at a rate of 1.73 cm$^3$/min·cm$^2$ such that a rise in a filtration pressure after filtration for 4 minutes does not exceed 100 kPa and that the particles have a specific resistance higher than 7000 Ω·cm.

2. A thermoplastic resin composition which comprises a thermoplastic resin and the titanium oxide defined in claim 1.

3. A thermoplastic resin composition which comprises a polyester resin and the titanium oxide defined in claim 1.

4. A polyester resin composition which is composed of a polyester resin and a multiplicity of centrifuged and dry crushed titanium oxide particles, and is characterized by the property that said resin composition passes through a filtration pressure tester under the following conditions such that the rise in filtration pressure after filtration for 1 hour satisfies the equation (I) below:

Measuring temperature: 300° C.
Rate of filtration: 1.11 g/min·cm$^2$
Pore size of filter: 7 μm $$P \leq 0.2C + 0.2 \tag{I}$$

where P is the rise in filtration pressure (MPa) and C is the content (wt %) of titanium oxide in the composition, provided that $0.3 \leq C \leq 15$.

5. A process for producing a polyester resin composition composed of a polyester resin and titanium oxide, said process comprising adding a suspension in ethylene glycol of the titanium oxide defined in claim 1 in the course of polymerization for polyester resin.

6. A process for producing a polyester resin composition composed of a polyester resin and titanium oxide, said process comprising incorporating, by using a mixer, the titanium oxide defined in claim 1 into a polyester resin after the polymerization for the polyester resin is substantially complete.

7. A process for producing titanium oxide which comprises the steps of dispersing raw titanium oxide into a liquid, clearing the resulting titanium oxide dispersion of selected titanium oxide particles by centrifuging and dry crushing, freeing the titanium oxide dispersion of liquid by drying, and causing the titanium oxide obtained in the previous step to impinge upon an object by the aid of a gas stream.

8. A process as defined in claim 7 which gives rise to titanium oxide characterized by its property that it disperses into ethylene glycol to give a 13 wt % suspension which passes through a filter paper with a pore size of 6/μm at a rate of 1.73 cm$^3$/min ·cm$^2$ such that a rise in a filtration pressure after filtration for 4 minutes does not exceed 100 kPa and that the particles have a specific resistance higher than 7000 Ω·cm.

9. The titanium oxide particles of claim 1, produced by a process comprising the steps of dispersing raw titanium oxide into a liquid, clearing the resulting titanium oxide dispersion of selected titanium oxide particles by centrifuging and dry crushing, removing the liquid from the dispersion, and crushing the titanium oxide left after removing the liquid.

10. The thermoplastic resin composition of claim 3, wherein said composition comprises from about 0.4 percent to about 5 percent by weight of said titanium oxide particles.

11. The thermoplastic resin composition of claim 2, wherein said composition comprises from about 0.3 percent to about 15 percent by weight of said titanium oxide particles.

12. The titanium oxide of claim 9, wherein said removing comprises evaporating.

13. The titanium oxide of claim 9, wherein said crushing comprises causing said titanium oxide to impinge upon an object by the aid of a gas stream.

14. The polyester resin of claim 4, further characterized by its property that a suspension of about 10 percent by weight of said titanium oxide in pure water has an electrical resistivity at 18° C. of at least 7000 Ω·cm.

* * * * *

UNITED STATES PATENT AND TRADEMARK OFFICE
CERTIFICATE OF CORRECTION

PATENT NO. : 6,153,679
DATED : November 28, 2000
INVENTOR(S) : Kawaji et al.

It is certified that error appears in the above-identified patent and that said Letters Patent is hereby corrected as shown below:

Column 3,
Line 54, please change "+15" to -- $\leq 15$ --.

Column 10, claim 7,
Lines 4 and 5, please delete "and dry crushing";
Line 6, please insert -- dried -- before "titanium"; and
Lines 6 and 7, please delete "obtained in the previous step".

Column 10, claim 9,
Line 5, please delete "and dry crushing".

Signed and Sealed this

Fifth Day of February, 2002

*Attest:*

JAMES E. ROGAN
*Director of the United States Patent and Trademark Office*

*Attesting Officer*